(12) United States Patent
Bostick et al.

(10) Patent No.: US 9,589,358 B1
(45) Date of Patent: Mar. 7, 2017

(54) DETERMINATION OF POINT OF INTEREST VIEWS FROM SELECTED VANTAGE POINTS

(71) Applicant: International Business Machines Corporation, Armonk, NY (US)

(72) Inventors: James E. Bostick, Cedar Park, TX (US); John M. Ganci, Jr., Cary, NC (US); Martin G. Keen, Cary, NC (US); Sarbajit K. Rakshit, Kolkata (IN); Craig M. Trim, Sylmar, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/869,358

(22) Filed: Sep. 29, 2015

(51) Int. Cl.
*G06K 9/00* (2006.01)
*G06T 7/00* (2006.01)
*G06F 17/30* (2006.01)

(52) U.S. Cl.
CPC ........ *G06T 7/0042* (2013.01); *G06F 17/3028* (2013.01); *G06K 9/00637* (2013.01); *G06T 2207/10028* (2013.01); *G06T 2207/30184* (2013.01)

(58) Field of Classification Search
CPC ..... G06T 7/0042; G06T 7/0044; G06T 15/20; G06T 17/05; G06T 19/00; G06T 2207/10028; G06T 2207/30184; G06F 17/3028; G06F 17/30241; G06F 17/30259; G06K 9/00704; G06K 9/00637
See application file for complete search history.

(56) References Cited

U.S. PATENT DOCUMENTS

| | | | |
|---|---|---|---|
| 8,531,449 B2 | 9/2013 | Lynch et al. | |
| 8,577,083 B2 * | 11/2013 | Kirk | G01C 11/06 382/103 |
| 8,686,852 B2 | 4/2014 | Ben-Dayan et al. | |
| 9,111,380 B2 * | 8/2015 | Piemonte | G06T 15/005 |

(Continued)

FOREIGN PATENT DOCUMENTS

WO     2009025446 A1     2/2009

OTHER PUBLICATIONS

Walton, George N., "Calculation of Obstructed View Factors by Adaptive Integration", NISTR 6925, National Institute of Standards and Technology, Technology Administration, Department of Commerce, Gaithersburg, MD, U.S.A., 20899-8633, pp. i-19, Nov. 2002.

*Primary Examiner* — Yon Couso
(74) *Attorney, Agent, or Firm* — Daniel R. Simek

(57) ABSTRACT

A three dimensional map of a designated area that includes location data and relative height data of vantage points, points of interest, and objects, within the designated area, is received. A line-of-sight view from the vantage points to the points of interest is determined by calculating an angle, a distance, and a direction between a vantage point and a point of interest based, at least in part, on the location data and relative height data associated with the three dimensional map of the designated area. Obstructions of the line-of-sight view between the vantage points and the points of interest are determined, based on the line-of-sight view, the location data, and the relative height data, and responsive to determining that the line-of-sight view is free of obstruction, identifying each point of interest viewable from each vantage points, within the designated area.

20 Claims, 5 Drawing Sheets

(56) References Cited

U.S. PATENT DOCUMENTS

2008/0122834 A1   5/2008   Ouzana
2012/0100867 A1   4/2012   Liang et al.
2014/0071119 A1   3/2014   Piemonte et al.

* cited by examiner

DETERMINATION OF POINT OF INTEREST VIEWS FROM SELECTED VANTAGE POINTS

BACKGROUND OF THE INVENTION

The present invention relates generally to the field of determining a field of view from a designated location, and more particularly to determining physical obstruction of a view from a selected building.

Within larger cities one finds a random arrangement of buildings of various heights and proximities to each other. Additionally, there may be many attractions visible from certain vantage points within a city, and the vantage points often include a directional view from a particular building. For example, in Paris, there are more than 50 points of attraction within the city, many of which are visible from the top of the Eiffel Tower. However, much fewer are viewable from the base of the Eiffel Tower as the tower and other taller buildings can obscure the view of attractions. Given a choice, many visitors to a city, and even residents of the city, may prefer accommodations that offer views of attractions within or near the city.

SUMMARY

Embodiments of the present invention disclose a method, computer program product, and system for determining a viewable point of interest from a vantage point. The method for determining viewable points of interest from vantage points provides that one or more processors receives a three dimensional map of a designated area, that includes location data of one or more vantage points, one or more points of interest, and objects, within the designated area, and relative height data of the one or more vantage points, the one or more points of interest, and the objects within the designated area, each height relative to the height of other vantage points and points of interest within designated area. The one or more processors determine a line-of-sight view from the one or more vantage points to the one or more points of interest within the designated area, by calculating an angle, a distance, and a direction between a vantage point and a point of interest based, at least in part, on the location data and relative height data associated with the three dimensional map of the designated area. The one or more processors determine whether the line-of-sight view between the one or more vantage points and the one or more points of interest are obstructed, based on the line-of-sight view, the location data, and the relative height data, of the one or more vantage points, the one or more points of interest, and the objects, within the designated area, and in response to determining that the line-of-sight view is free of obstruction, one or more processors identify each of the one or more points of interest that are viewable from each of the one or more vantage points, within the designated area.

DETAILED DESCRIPTION

Figure 1:
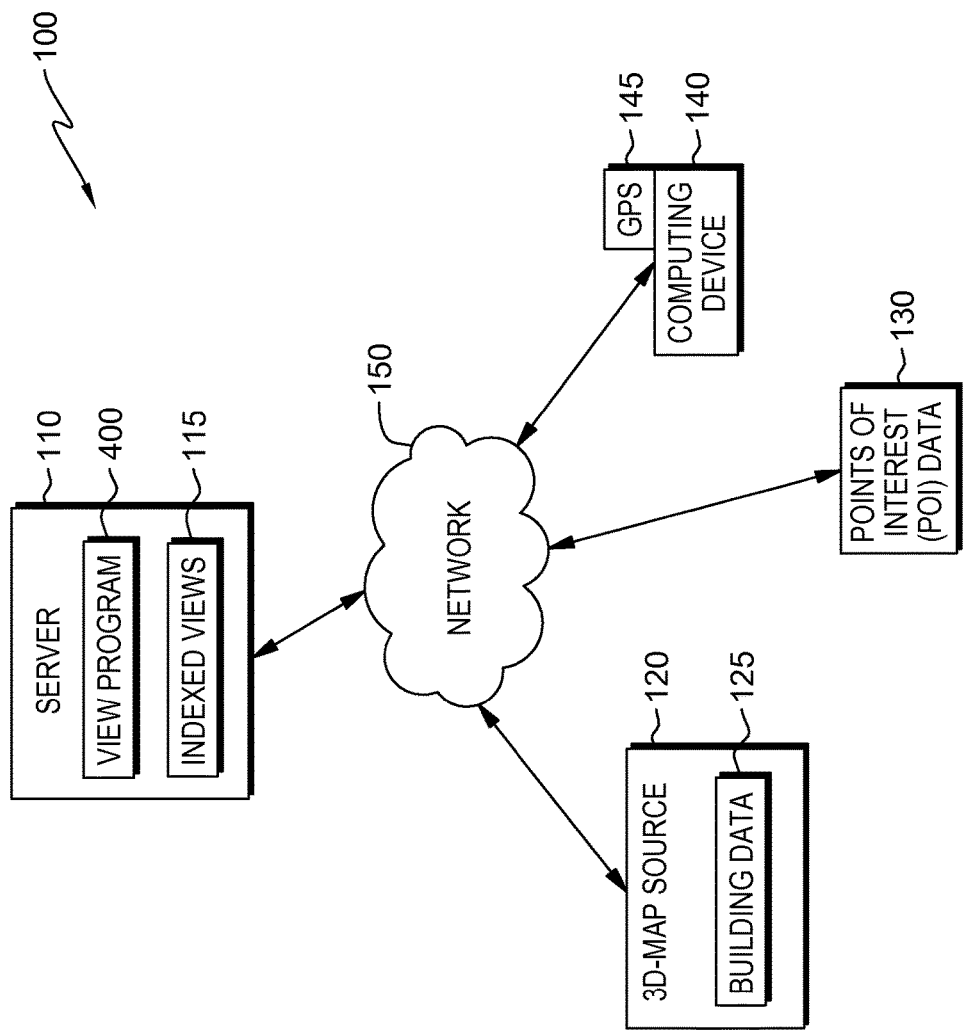
FIG. 1 is a functional block diagram illustrating a distributed computer processing environment, in accordance with an embodiment of the present invention.

Embodiments of the present invention recognize that many points of attraction may exist within an area, such as a large city, and some visitors as well as residents of the large city may wish to know which buildings within the city have a view of particular points of attraction. It is difficult to determine which attractions are viewable from which building because some buildings, or other objects, may be an obstruction to a view of a point of attraction from another building. The difficulty is compounded when taking into account the elevation of certain floors of the building from which an attraction is viewed, as well as the direction each side of the building faces. Likewise, owners of buildings, particularly hotels or those offering viewing vantage points to the public, may wish to promote the various attractions viewable from their respective buildings.

Embodiments of the present invention provide a method, computer program product, and computer system for determining vantage points, which are locations and their elevations from which a user can view other locations and areas, within a designated area that may be defined by a scale of a three dimensional map display, from which a point of attraction (also referred to as a point of interest) is viewable without obstruction, based on receiving a three dimensional map of the designated area, and data associated with the vantage points and points of interest within the designated area. For clarity of discussion and example of embodiments of the present invention, vantage points will hereafter be referred to as buildings within an area of a city as displayed by an Internet-based map application; however embodiments of the present invention may apply to other designated mapped areas, and are not limited to buildings within an area of a city as displayed by a scale of a map. In some embodiments of the present invention, given a particular point of interest within a designated area, the buildings from which the point of attraction is viewable are determined. In other embodiments, given a particular building within a designated area of a city, the points of attraction viewable from the building are determined. In yet other embodiments, the floor(s) and direction (or side of the building), from which the point of attraction is viewable, are determined. In still other embodiments, a notification is sent to a mobile computing device based on a proximity of the mobile device to a building from which a designated point of attraction is viewable.

It is pointed out that views may be obscured by objects other than buildings, such as naturally occurring structures or other man-made structures. Naturally occurring structures may be rock formations, hills, mountains, or trees, for example. Man-made objects that obscure a view include buildings, but may also include bridges, platforms, monuments, communication towers, and the like. For purposes of simplicity and clarity, discussion of obstruction of views by buildings herein, collectively includes obstruction by any naturally occurring or man-made objects whose location and associated height data are received with a three dimensional map.

The present invention will now be described in detail with reference to the Figures. FIG. 1 is a functional block diagram illustrating a distributed computer processing environment, generally designated 100, in accordance with an embodiment of the present invention. Distributed computer processing environment 100 includes server 110, shown hosting view program 400 and indexed views 115, three dimensional map source 120, which includes building data 125, points of interest data 130, computing device 140 enabled by global positioning service (GPS) 145, all interconnected via network 150.

Network 150 can be, for example, a local area network (LAN), a telecommunications network, a wide area network (WAN), such as the Internet, a virtual local area network (VLAN), or any combination that can include wired, wireless, or optical connections. In general, network 150 can be any combination of connections and protocols that will support communications between server 110, three dimensional map source 120, points of interest data 130, computing device 140, and view program 400, in accordance with embodiments of the present invention.

Server 110 is a computing device that hosts view program 400, and stores results of which points of interest are viewable from buildings within the designated area in indexed views 115. Server 110 has access to three dimensional map source 120 and points of interest data 130, and in some embodiments of the present invention, indexed views 115 is accessible to computing device 140. In some embodiments, server 110 may be a management server, a web server, a mobile computing device, or any other electronic device or computing system capable of receiving and sending data. In other embodiments, server 110 may represent a virtual computing device of a computing system utilizing multiple computers as a server system, such as in a cloud computing environment. In another embodiment, server 110 may be a laptop computer, a tablet computer, a netbook computer, a personal computer (PC), a desktop computer, a personal digital assistant (PDA), a smart phone, or any programmable electronic device capable of performing the operational steps of view program 400, via network 150. In another embodiment, server 110 represents a computing system utilizing clustered computers and components (e.g., database server computers, application server computers, etc.) that act as a single pool of seamless resources when accessed within distributed computer processing environment 100. Server 110 may include internal and external hardware components, as depicted and described with reference to FIG. 5.

View program 400 receives three dimensional map data from three dimensional map source 120, which includes details from building data 125, and data regarding interests within a designated area from points of interest data 130. View program 400 determines a point of view from buildings within a designated area to each point of interest within the designated area. Based on the location of each building, the relative heights of each building, and the location and relative heights of the points of interest, view program 400 determines if a view from a building to a point of interest is obscured by another building. Because the distances between objects and the heights of objects within the three dimensional map of the designated area are relative to each other, view program 400 calculates the height to height path distances and angles between buildings and points of interest, and determines if the location and relative height of a second building, or other object, blocks the view of a point of interest from a first building. In some embodiments of the present invention, view program 400 determines a view from a building from a point at or near the top of the building. In some embodiments of the present invention, the information regarding each building, received by view program 400 from building data 125 of map source 120, includes the number of floors of each building. View program 400 can determine which floors of the building have a view of a particular point of interest, if any. In some embodiments of the present invention, view program 400, having determined the visibility of points of attraction from one or more floors of a building, generates a three dimensional representation of the viewpoint from the selected building and floor to the point of interest, based on the received three dimensional map data, thus providing a first person visualization of the viewpoint.

For example, view program 400 determines that building A has a view of point of interest P from the top of building A, and that building A is a sixteen story building. View program 400 determines that building B obstructs the view of point of interest P, from approximately halfway up building A. View program 400 determines that point of interest P is viewable from floors nine through sixteen of building A.

In some embodiments of the present invention, view program 400 calculates the viewable points of interest from each building within a designated area, and indexes the results in indexed views 115. Once the point of interests viewable from each building are determined, the result is unlikely to change within a designated time period, for example, a month, a three month period, or a six month period. The indexed results of calculating the viewable points of interest from each building (and in some embodiments, the floors from which the points of interest are viewable) in indexed views 115 are stored in a location and format that facilitates downloading by user requests. This enables the results of viewable points of interest from buildings within the designated area to be indexed and accessed by authorized users without having to repeatedly perform calculations upon request. In some embodiments of the present invention, the viewable points of interest for each building within a designated area are recalculated at a predetermined interval of time, for example, every three months, to update the viewable points of interest data.

Three dimensional map source 120, hereafter "map source 120", is a source of three dimensional map data that includes building data 125. Map source 120 includes the location of buildings within a designated area, the orientation of the buildings (e.g. which direction each side of a building faces), and the height of the buildings, relative to each other and to points of interest. In some embodiments of the present invention, map source 120 includes the number of stories of each building, based on the relative height of each building compared to an object of known height and/or known number of stories. Map data 120 also includes information regarding the geographic change in altitude used to adjust relative heights of buildings. For example, building A appears to be twice as tall as building B; however the geographic base of building B is actually lower than the geographic base of building A, by approximately half the relative height of building A, as determined by global positioning system (GPS) data, for example. Therefore, the heights of building A and building B are approximately the same, and map data 120 indicates that the relative height of the top of building B is approximately half the height of building A.

Building data 125 includes information regarding the buildings within the designated area, including the number of floors of each building if available. In some embodiments of the present invention, building data 125 includes information as to whether a building includes areas available to the public for viewing. In other embodiments, building data 125 may identify a known type of building, such as whether a building includes hotel facilities, restaurant facilities or if the building is private.

Points of interest data 130 is a repository that includes information associated with one or more points of interest, or points of attraction, located within the designated area. In some embodiments of the present invention, points of interest data 130 includes location information of each point of interest, for example, location information provided by GPS resources. In other embodiments a user may input a point of interest, for example, designating a landmark by inputting GPS coordinates of the point of interest and providing a user-designated label. In yet other embodiments of the present invention, a user may input or select a category of points of interest, and view program 400 identifies the points of interest located within the map area that are associated with the category. Points of interest may also include identification of the interest, and details of components of the interest, for instance, if the interest has multiple attributes or parts, viewable from different directions. Points of interest data 130 is accessed by view program 400 from server 110 via network 150 to determine from which buildings within the designated area, a particular point of interest may be viewed. In some embodiments of the present invention, points of interest data 130 may be accessible by computing device 140 via network 150, to select a point of interest to determine, via view program 400, which buildings have a view of the selected point of interest.

Computing device 140 has access to view program 400 from which a user of computing device 140 may select a particular point of interest or a particular building within the designated area. In some embodiments of the present invention, computing device 140 accesses view program 400 and receives a three dimensional map of a designated area, and is able to select a building within the three dimensional map to request the points of interest viewable from the selected building. View program 400 responds by accessing indexed views 115 and sending the requested point of interest information for the selected building. In other embodiments, computing device 140 accesses view program 400 and selects a point of interest, and requests a list of buildings from which the point of interest is viewable.

In some embodiments of the present invention, computing device 140 may be a mobile computing device, a laptop computer, a tablet computer, a netbook computer, a personal computer, a desktop computer, a personal digital assistant (PDA), a smart phone, a wearable computer, or any other electronic device or computing system capable of receiving and sending data, and accessing functions of view program 400. In other embodiments, computing device 140 may represent a virtual computing device of a computing system utilizing multiple computers as a server system, such as in a cloud computing environment. In another embodiment, computing device 140 represents a computing system utilizing clustered computers and components (e.g., database server computers, application server computers, etc.) that act as a single pool of seamless resources when accessed within distributed computer processing environment 100. Computing device 140 may include internal and external hardware components, as depicted and described with reference to FIG. 5.

GPS 145 is a global positioning system module of computing device 140 and is capable of determining the location of computing device 140 with respect to the designated area identified by map source 120, points of interest data 130 and view program 400. In response to a user selecting a setting of view program 400, GPS 145 determines whether the position of computing device 140 is in a defined proximity, for example, 100 meters, of a building that has a view of a point of interest within the designated area. GPS 145 provides position location data to view program 400 via network 150 and, in response to computing device 140 entering the proximity distance of a building having a view of a point of interest, computing device 140 receives a notification from view program 400 indicating the building and the particular point of interest that is viewable from the building.

Figure 2:
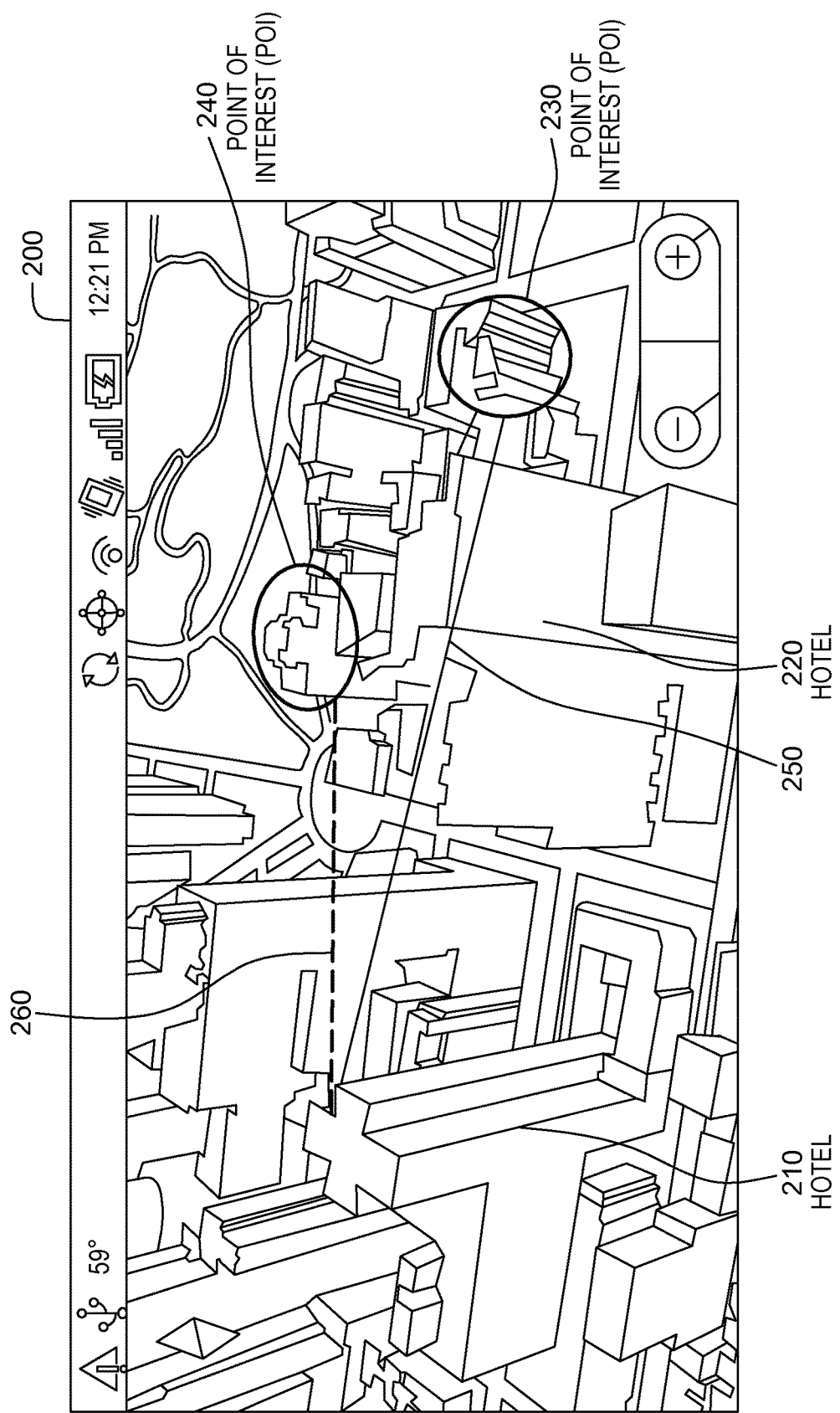
FIG. 2 is a functional block diagram illustrating a three dimensional map of a city area, in accordance with an embodiment of the present invention.

FIG. 2 is an exemplary illustration of three dimensional map 200 of a city area that includes multiple buildings and points of interest, in accordance with an embodiment of the present invention. FIG. 2 includes hotels 210 and 220, points of interest 230 and 240, indicated by a circled area, viewed from an elevated, side angle perspective. View 250, and view 260 represent line-of-sight pathways from hotel 210 to point of interest 230 and point of interest 240, respectively. Relative positions and relative heights of hotel 210, hotel 220, point of interest 230 and point of interest 240 are represented in three dimensional map 200, and the geo-coordinates of hotels and points of interest are known from GPS data, therefore distances between structures can be calculated. Having building and point of interest relative heights, geo-coordinate location, and distance between structures, height to height distances and angles can be calculated to determine if a building obstructs a view of a point of interest from another building.

View 250 is depicted as originating from the top of hotel 210 and directed towards point of interest 230; however, view 250 intersects hotel 220, obscuring the view of point of interest 230 from hotel 210. As hotel 220 is in the line-of-sight of view between hotel 210 and point of interest 230, and with no buildings of substantial height between hotel 220 and point of interest 230, it follows that hotel 220 has an unobstructed view of point of interest 230. Alternatively, hotel 210 does have an unobstructed view of point of interest 240 as depicted by view 260. In both cases in which an unobstructed view exists between hotels 210 and 220, and a point of interest, view program 400 determines which floors within the hotels, and which sides of the hotels, have views of the respective points of interest, by calculations based on the relative heights of the buildings and the points of interest, the relative locations of the buildings and points of interest, and the direction in which each hotel side faces. Although described by use of hotel buildings and points of interest locations, embodiments of the present invention determine the viewpoints of identified objects or locations from buildings within the three dimensional map area.

Figure 3:
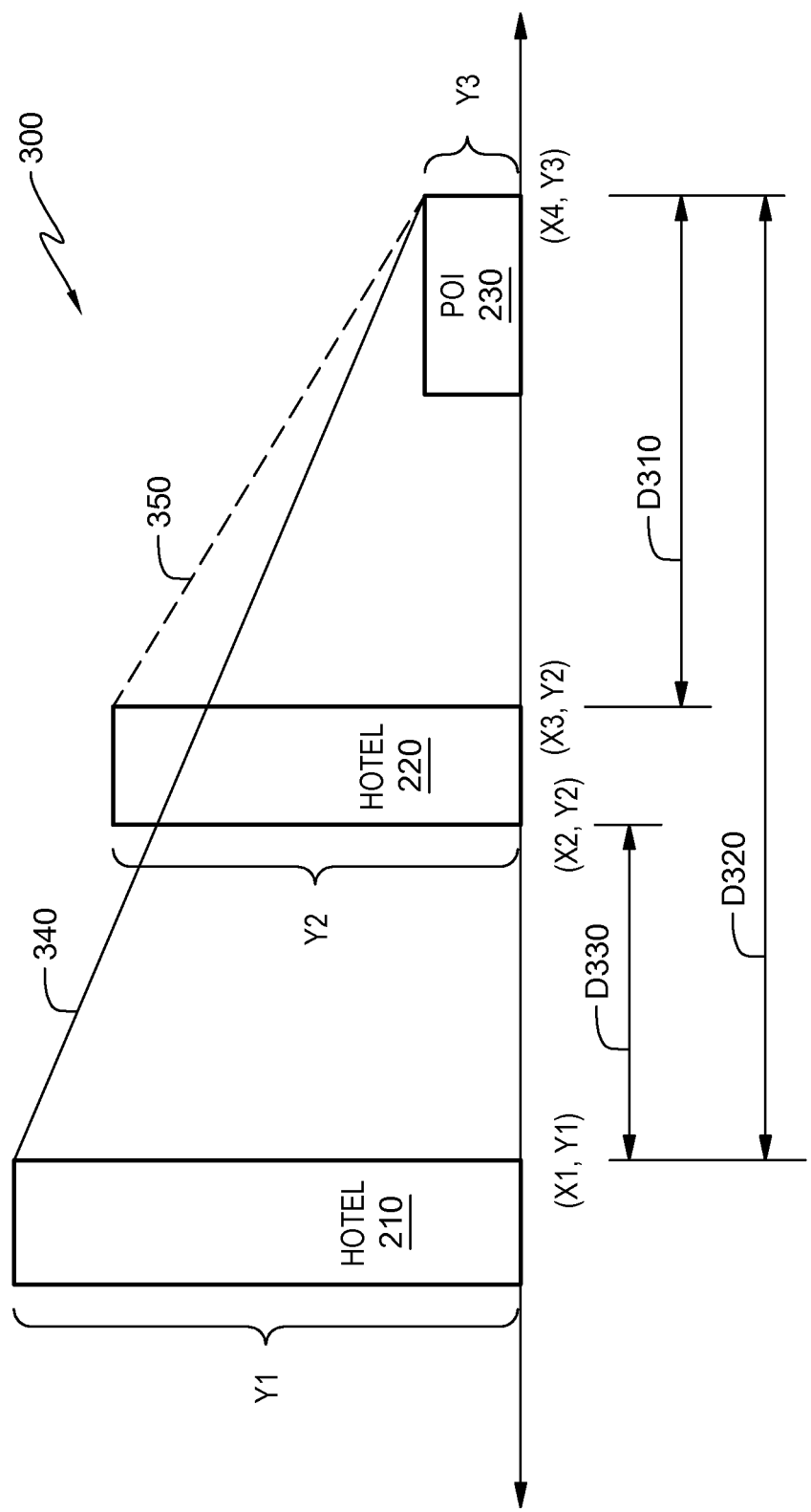
FIG. 3 is a block diagram illustrating an exemplary view of a three dimensional map of a city area, in accordance with an embodiment of the present invention.

FIG. 3 is an exemplary block diagram illustrating a two dimensional side view 300 of a portion of a three dimensional map of a city area, in accordance with an embodiment of the present invention. Side view 300 includes hotel 210, hotel 220 and point of interest 230 represented in the same plane and located by an arbitrary coordinate scale of relative distance and height within the same plane. The side of hotel 210 facing point of interest 230 is positioned at "X1, and the side of hotel 220 facing point of interest 230 is positioned at point "X3". The side of hotel 220 closest to hotel 210 is positioned at point "X2". The furthest side of point of interest 230 is positioned at point "X4". The relative height of hotel 210 is "Y1", the relative height of hotel 220 is "Y2" and the relative height of point of interest 230 is "Y3".

The distance from hotel 210 to point of interest 230 can be calculated from the difference between X4 and X1, designated as D320. The distance between hotel 220 and point of interest 230 can be calculated by the difference between X3 and X4, designated as D310. The distance between the side of hotel 210 facing point of interest 230 and the side of hotel 220 facing hotel 210 is calculated by the difference between X2 and X1, designated as D330. Given the relative heights and distances of the buildings in side view 300, the angle and distance of view 340 from hotel 210 to point of interest 230, and the angle and distance of view 350 from hotel 220 to point of interest 230, can be calculate by view program 400. In the example of FIG. 3, view program 400 determines whether view 340 is obscured by buildings in the view path (e.g. hotel 220). In one exemplary embodiment of the present invention, view program 400 determines the relative height of view 340 at point X2, and comparing the relative height of view 340 at point X2 to the relative height of hotel 220 (at point X2). Determining that the relative height of hotel 220 exceeds the height of view 340 at point X2, view program 400 determines that view 340, of point of interest 230 from the top of hotel 210, is obstructed.

Similarly, view program 400 determines if view 350 from the top of hotel 220 to point of interest 230 is obstructed. Because no buildings are in the line-of-sight between hotel 220 and point of interest 230, view program 400 determines that hotel 220 has a view of point of interest 230, and that point of interest 230 is viewable from hotel 220. In some embodiments of the present invention, view program 400 may perform additional calculations to determine if point of interest 230 is viewable from multiple floors (and multiple sides) of hotel 220. View program 400 determines location and relative heights of buildings between hotel 220 and point of interest 230 to determine the floors (and building sides) from which point of interest 230 is viewable. In some embodiments of the present invention, view program 400 sends results of determining buildings, sides of buildings, and floors of buildings, from which points of interest are viewable, to indexed views 115, for storage and expedient access on request.

Figure 4:
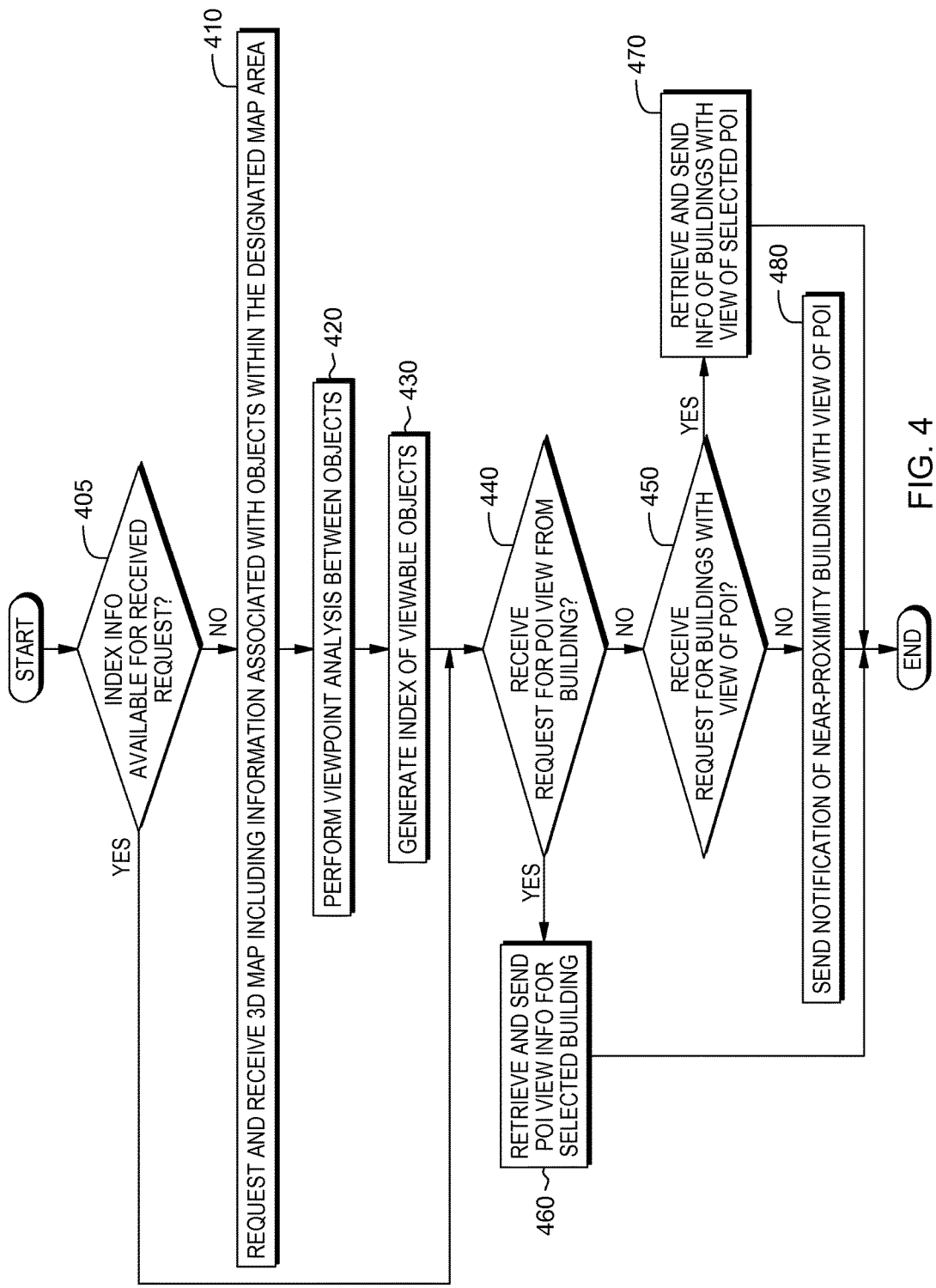
FIG. 4 illustrates operational steps of a view program, inserted on a server within the distributed computer processing environment of FIG. 1, in accordance with an embodiment of the present invention.

FIG. 4 illustrates operational steps of view program 400, inserted on server 110 within the data processing environment of FIG. 1, in accordance with an embodiment of the present invention.

In decision step 405 view program 400 determines whether index view information is available for a received request. View program 400 receives a request regarding views of points of interest from buildings within a designated city area. View program 400 accesses a repository, for example indexed views 115 (FIG. 1), of previously determined view data to determine whether the requested view information is available. Determining that the requested view information is available within the accessed repository, (step 405, "YES" branch), view program 400 proceeds to step 440 to determine whether the request is for identifying points of interest viewable from a designated building, identifying buildings from which a point of interest is viewable, or to receive notification of a near-by building from which a point of interest is viewable, discussed in detail below.

Determining that the requested view information is not available within the accessed repository, view program 400 proceeds to step 410. In step 410 view program 400 receives a three dimensional (3D) map including information associated with objects within the designated map area. In some embodiments of the present invention, a selection is made, by a user of view program 400, of a city or city area. View program 400 requests and receives a 3D map of the requested area from a 3D map source, for example, 3D maps from Google Maps™, or Google Earth™ (Google Maps and Google Earth are registered trademarks of Google Inc. in the U.S., and may include trademark rights in various jurisdictions throughout the world).

The information of the received 3D map includes buildings within the requested area, the relative heights of the tops of buildings in the map area, position and direction of the buildings, and distances between buildings. In some embodiments of the present invention, the 3D map includes identification of points of interest within the map area, as well as information associated with the location, relative height, and distances between buildings or other objects within the map area. In some embodiments of the present invention, the position and distance information of buildings and points of interest in the map area may be augmented by geo-coordinates of objects in the map area, provided by global positioning system (GPS) data, included with the map information. In other embodiments, the GPS data may be received separately by view program 400, via server 110 connected to network 150, and applied to the received 3D map.

For example, view program 400 receives a request for city area "A" from a user of computing device 140. View program 400, residing on server 110 receives the city area request and requests and receives a 3D map from 3D map source 120 that includes relative heights of buildings, and distances between buildings in city area A, from building data 125. The associated information of the 3D map includes points of interest (or points of attraction) data, from points of interest data 130, as depicted in FIG. 1. In some embodiments of the present invention, 3D map source 120 includes building data 125 and points of interest data 130 and serves as a single source for 3D map data and information. In other embodiments, view program 400 receives data and information associated with the requested 3D map area from multiple sources.

Having received the 3D map and associated information of the requested city area, in step 420 view program 400 performs viewpoint analysis between objects that are within the requested city area. Using the position, distance, and relative height information of the received 3D map, view program 400 analyzes the height-to-height distances and angles between objects of the 3D map area. View program 400 determines the viewpoints between objects, which in some embodiments of the present invention includes viewpoints from each building to each point of interest, each building to other buildings, or each point of interest to another point of interest. Having the position, direction facing, and relative height of buildings and points of interest, and having the distances between buildings and points of interest, view program 400 calculates the angle and view direction from each building of the requested map area to each point of interest and determines if the view from a building to a point of interest is obstructed by another building. View program 400 completes this analysis for buildings and points of interest within the map area determining which buildings have unobstructed views of which points of interest, and conversely, which points of interest have unobstructed views to which buildings.

A simplified example of determining obstruction of a line of view from hotel 210 to point of interest 230 is presented, however embodiments of the present invention may be implemented in various ways. View program 400 determines the distance between the base of hotel 210 and point of interest 230 (X4-X1 in FIG. 3). View program 400 determines the height of hotel 210 (Y1 in FIG. 3) which may be obtained from building information or GPS data), and determines the relative height of point of interest 230 (Y3 in FIG. 3; relative to hotel 210). Determining whether hotel 220 obstructs the view from hotel 210 to point of interest 230 may be performed by determining the height of the line of view from hotel 210 to point of interest 230 at the point of which the line of view intersects hotel 220 (at point X3 in FIG. 3). The angle of the line of view from the top of hotel 210 remains constant as it intersects the side of hotel 220. The height of the line of view can be determined by the distance between the side of hotel 220 nearest hotel 210 divided by the tangent of the angle of the line of view from hotel 210. This height is compared to the known height of hotel 220 (from hotel information or GPS data) relative to hotel 210, and if the height of hotel 220 exceeds the height of the line of view from hotel 210, the view of point of interest 230 is obstructed.

In step 430 view program 400 generates an index of viewable objects. In some embodiments of the present invention, view program 400 generates an index that identifies the points of interest that are viewable from each building within the requested map area. The index may also be structured to identify the buildings from which each point of interest is viewable. The generated index is stored and is accessed by view program 400 upon receiving a request for view information. Generating an index enables rapid response to requests as the view, or viewpoint information has been previously generated. The indexed view information that includes position and height of buildings and points of interest, is unlikely to change within larger blocks of time, making the indexed view data stable. In some embodiments of the present invention, the viewpoint data is recalculated within a specified period of time, for each building and point of interest within the map area, taking into account changes and updates that may have been added due to construction, seasons, or changes in user points of interest. For example, in some embodiments, the index information is updated by recalculating and indexing every month, whereas in other embodiments, the index information may be updated every six months.

In decision step 440, view program 400 determines if a received request is for a point of interest view from a designated building. Determining that the received request is for a specified point of interest viewable from a specified building (step 440, "YES" branch), view program 400, in step 460, retrieves the information regarding the points of interest that are viewable from the designated building, and sends the information to the requesting user. In some embodiments of the present invention, view program 400 retrieves the requested view information from an indexed view repository, such as indexed view 115. In other embodiments the view information for the designated point of interest viewable from the designated building may have been calculated and determined at the time of the request, and view program 400 accesses the information from memory and sends the view information to the requesting user.

For example, a user of computing device 140 requests whether a view of point of interest "P" is available from building "B" within city area "A". View program 400 determines if the requested view information exists in indexed views 115, and finding the view information for building B in city area A is indexed, forwards the information to computing device 140 via network 150. In some embodiments of the present invention, all viewable points of interest from building B may be sent to the user. In other embodiments, a response is sent confirming that the designated point of interest P is or is not viewable from building B in city area A.

For the case in which view program 400 determines that the received request was not for one or more points of interest views from a designated building, (step 440, "NO" branch), view program 400, in decision step 450, determines if the received request is for identifying the buildings having a view of a designated point of interest. Determining that the request is for identifying the buildings from which a designated point of interest is viewable, (step 450, "YES" branch), view program 400, in step 470, retrieves the information regarding the designated point of interest from an index repository, which identifies the buildings from which the designated point of interest is viewable, and sends the information to the computing device of the requesting user. In some embodiments of the present invention, the identification of the buildings from which the designated point of interest is viewable may have been calculated and determined at the time of the request, and view program 400 accesses the information from memory and sends the view information to the computing device of the requesting user.

For example, view program 400 receives a request from computing device 140, requesting the buildings from which point of interest P is viewable within city area A. View program 400 accesses indexed views 115 for point of interest P, and determines that buildings B, C, and D have views of point of interest P, and sends the information to computing device 140.

For the case in which view program 400 determines that the received request was not for identifying buildings having a view of a designated point of interest (step 450, "NO" branch), view program 400, in step 480, determines that the request is for a notification service, and sends notification of near-proximity buildings having a view of a point of interest within the requested 3D map area. In some embodiments of the present invention, "near-proximity" is a setting that a user of view program 400 defines by a designated distance, for example 100 meters. In other embodiments, "near-proximity" is a default setting of distance from the GPS location of a user's computing device displaying information from view program 400. In some embodiments of the present invention, view program 400 provides a notification service to requesting computing devices in which a notification is sent indicating a building in the proximity of the computing device, which has a view of one or more points of interest within the requested 3D map area. In some embodiments of the present invention, view program 400 determines that a received request is not for identifying points of interest viewable from a designated building, and further determines that the received request is not for identifying buildings from which a particular point of interest is viewable, and therefore concludes the request is for providing a notification service Subsequent to receiving a request from a computing device for the notification service, view program 400 identifies and tracks the location of the computing device within the requested 3D map area, by means of GPS 145 connected to computing device 140 (FIG. 1). In response to determining the computing device location is within a specified distance from a building having a view of one or more points of interest, view program 400 sends a notification to the computing device indicating the building within the proximity of the computing device and the point of interest viewable from the building.

Having provided requested point of interest information in step 460, building information in step 470, and/or notification information in step 480, view program 400 ends awaiting receipt of additional requests.

Figure 5:
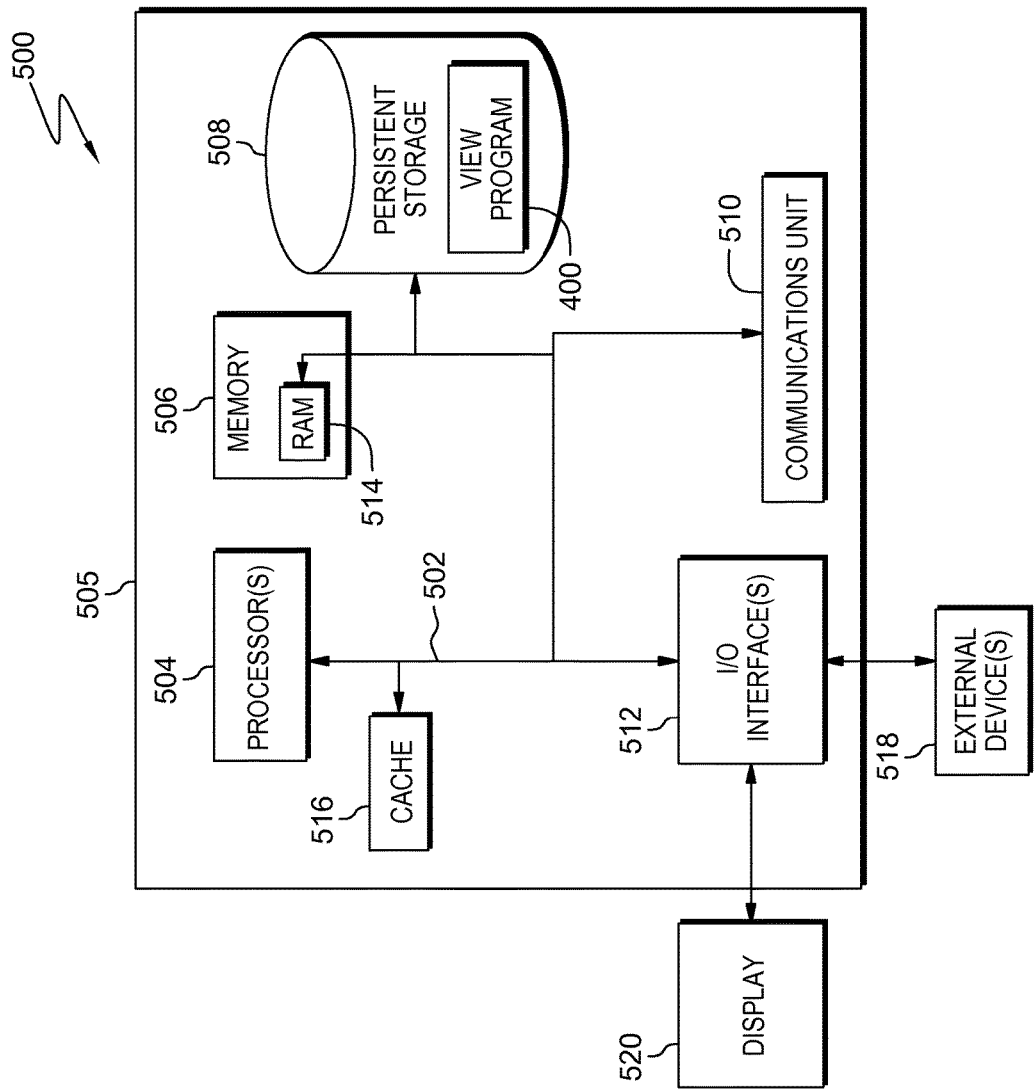
FIG. 5 depicts a block diagram of components of a computing device capable of operationally performing the view program, in accordance with an embodiment of the present invention.

FIG. 5 depicts a block diagram of components of computing system 500, including computing device 505, capable of operationally performing view program 400, in accordance with an embodiment of the present invention.

Computing device 505, similar to server 110 and computing device 140, include components and functional capability in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Computing device 505 includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506, cache memory 516, and persistent storage 508 are computer readable storage media. In this embodiment, memory 506 includes random access memory (RAM) 514. In general, memory 506 can include any suitable volatile or non-volatile computer readable storage media.

View program 400 is stored in persistent storage 508 for execution by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices, including resources of distributed computer processing environment 100, server 110, and computing devices 505 and 140. In these examples, communications unit 510 includes one or more network interface cards. Communications unit 510 may provide communications through the use of either or both physical and wireless communications links. View program 400 may be downloaded to persistent storage 508 through communications unit 510.

I/O interface(s) 512 allows for input and output of data with other devices that may be connected to computing system 500. For example, I/O interface 512 may provide a connection to external devices 518 such as a keyboard, keypad, a touch screen, and/or some other suitable input device. External devices 518 can also include portable computer readable storage media such as, for example, thumb drives, portable optical or magnetic disks, and memory cards. Software and data used to practice embodiments of the present invention, e.g., view program 400 can be stored on such portable computer readable storage media and can be loaded onto persistent storage 508 via I/O interface(s) 512. I/O interface(s) 512 also connect to a display 520.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for determining a viewable point of interest from a vantage point, the method comprising:
receiving, by one or more processors, a three dimensional map of a designated area, that includes location data and relative height data of one or more vantage points, one or more points of interest, and one or more objects, within the designated area, wherein each height of the one or more vantage points, the one or more points of interest, and the one or more objects, is relative to heights of other one or more vantage points, one or more points of interest, and one or more objects, within the designated area;
determining, by one or more processors, a line-of-sight view from the one or more vantage points to the one or more points of interest within the designated area, by calculating an angle, a distance, and a direction between a vantage point and a point of interest based, at least in part, on the location data and relative height data associated with the three dimensional map of the designated area;
determining, by one or more processors, whether the line-of-sight view between the one or more vantage points and the one or more points of interest are obstructed, based on the line-of-sight view, the location data, and the relative height data, of the one or more vantage points, the one or more points of interest, and the objects, within the designated area; and
responsive to determining that the line-of-sight view is free of obstruction, one or more processors identifying each of the one or more points of interest that are viewable from each of the one or more vantage points, within the designated area.

2. The method of claim 1, further comprising:
responsive to determining that the line-of-sight view is free of obstruction, one or more processors identifying each of the one or more vantage points from which one of the one or more points of interest are viewable, within the designated area.

3. The method of claim 1, wherein the one or more vantage points are one or more buildings within an area of a city as defined by the three dimensional map of the designated area.

4. The method of claim 3, wherein the line-of-sight is determined from each side of the one or more buildings to each of the one or more points of interest.

5. The method of claim 3, wherein determining, by one or more processors, the line-of-sight view from the one or more buildings to the one or more points of interest within the area of the city as defined by the three dimensional map of the designated area, includes determining which of the one or more points of interest are viewable from which floors of each building of the one or more buildings.

6. The method of claim 1, further comprising:
indexing, by one or more processors, a first set of data that includes the one or more points of interest that are viewable from each of the one or more vantage points, within the designated area, and a second set of data that includes the vantage points from which one or more points of interest are viewable, within the designated area; and storing, by one or more processors, the first set of data and the second set of data, having a format and in a location that enables downloading.

7. The method of claim 1, further comprising, receiving, by one or more processors, a request from a computing device to provide a notification in response to determining the computing device is within a specified distance of one of the one or more vantage points having a view of at least one of the one or more points of interest within a designated area;

determining, by one or more processors, a location of the computing device within the designated area; and responsive to determining the location of the computing device to be within the specified distance of one of the one or more vantage points having a view of at least one of the one or more points of interest within the designated area, sending, by one or more processors, the notification to the computing device indicating the vantage point of the one or more vantage points from which the at least one of the one or more points of interest is viewable.

8. A computer program product for determining a viewable point of interest from a vantage point, the computer program product comprising:

one or more computer readable storage media wherein the computer readable storage medium is not a transitory signal per se, and program instructions stored on the one or more computer readable storage media, the program instructions comprising:

program instructions to receive a three dimensional map of a designated area, that includes location data and relative height data of one or more vantage points, one or more points of interest, and one or more objects, within the designated area, wherein each height of the one or more vantage points, the one or more points of interest, and the one or more objects, is relative to heights of other one or more vantage points, one or more points of interest, and one or more objects, within the designated area;

program instructions to determine a line-of-sight view from the one or more vantage points to the one or more points of interest within the designated area, by calculating an angle, a distance, and a direction between a vantage point and a point of interest based, at least in part, on the location data and relative height data associated with the three dimensional map of the designated area;

program instructions to determine whether the line-of-sight view between the one or more vantage points and the one or more points of interest are obstructed, based on the line-of-sight view, the location data, and the relative height data, of the one or more vantage points, the one or more points of interest, and the objects, within the designated area; and responsive to determining that the line-of-sight view is free of obstruction, program instructions to identify each of the one or more points of interest that are viewable from each of the one or more vantage points, within the designated area.

9. The computer program product of claim 8, further comprising:

responsive to determining that the line-of-sight view is free of obstruction, program instructions to identify each of the one or more vantage points from which one of the one or more points of interest are viewable, within the designated area.

10. The computer program product of claim 8, wherein the one or more vantage points are one or more buildings within a city area.

11. The computer program product of claim 10, wherein the line-of-sight is determined from each side of the one or more buildings to each of the one or more points of interest.

12. The computer program product of claim 10, wherein determining, by one or more processors, the line-of-sight view from the one or more buildings to the one or more points of interest within the area of the city as defined by the three dimensional map of the designated area, includes determining which of the one or more points of interest are viewable from which floors of each building of the one or more buildings.

13. The computer program product of claim 8, further comprising:

program instructions to index a first set of data that includes the one or more points of interest that are viewable from each of the one or more vantage points, within the designated area, and a second set of data that includes the vantage points from which one or more points of interest are viewable, within the designated area; and program instructions to store the first set of data and the second set of data, having a format and in a location that enables downloading.

14. The computer program product of claim 8, further comprising, program instructions to receive a request from a computing device to provide a notification in response to determining the computing device is within a specified distance of one of the one or more vantage points having a view of at least one of the one or more points of interest within a designated area;

program instructions to determine a location of the computing device within the designated area; and responsive to determining the location of the computing device to be within the specified distance of one of the one or more vantage points having a view of at least one of the one or more points of interest within the designated area, program instructions to send the notification to the computing device indicating the vantage point of the one or more vantage points from which the at least one of the one or more points of interest is viewable.

15. A computer system for determining a viewable point of interest from a vantage point, the computer system comprising:

one or more computer processors;

one or more computer readable storage media; and program instructions stored on the one or more computer readable storage media for execution by at least one of the one or more processors, the program instructions comprising:

program instructions to receive a three dimensional map of a designated area, that includes location data and relative height data of one or more vantage points, one or more points of interest, and one or more objects, within the designated area, wherein each height of the one or more vantage points, the one or more points of interest, and the one or more objects, is relative to heights of other one or more vantage points, one or more points of interest, and one or more objects, within the designated area;

program instructions to determine a line-of-sight view from the one or more vantage points to the one or more points of interest within the designated area, by calculating an angle, a distance, and a direction between a vantage point and a point of interest based, at least in part, on the location data and relative height data associated with the three dimensional map of the designated area;

program instructions to determine whether the line-of-sight view between the one or more vantage points and the one or more points of interest are obstructed, based on the line-of-sight view, the location data, and the relative height data, of the one or more vantage points, the one or more points of interest, and the objects, within the designated area; and responsive to determining that the line-of-sight view is free of obstruction, program instructions to identify each of the one or more points of interest that are viewable from each of the one or more vantage points, within the designated area.

16. The computer system of claim 15, further comprising:
responsive to determining that the line-of-sight view is free of obstruction, program instructions to identify each of the one or more vantage points from which one of the one or more points of interest are viewable, within the designated area.

17. The computer system of claim 15, wherein the one or more vantage points are one or more buildings within an area defined by the three dimensional map of a city, and the line-of-sight is determined from each side of the one or more buildings to each of the one or more points of interest.

18. The computer system of claim 17, wherein determining, by one or more processors, the line-of-sight view from the one or more buildings to the one or more points of interest within the area of the city as defined by the three dimensional map of the designated area, includes determining which of the one or more points of interest are viewable from which floors of each building of the one or more buildings.

19. The computer system of claim 15, further comprising:
program instructions to index a first set of data that includes the one or more points of interest that are viewable from each of the one or more vantage points, within the designated area, and a second set of data that includes the vantage points from which one or more points of interest are viewable, within the designated area; and program instructions to store the first set of data and the second set of data, having a format and in a location that enables downloading.

20. The computer system of claim 15, further comprising,
program instructions to receive a request from a computing device to provide a notification in response to determining the computing device is within a specified distance of one of the one or more vantage points having a view of at least one of the one or more points of interest within a designated area;

program instructions to determine a location of the computing device within the designated area; and responsive to determining the location of the computing device to be within the specified distance of one of the one or more vantage points having a view of at least one of the one or more points of interest within the designated area, program instructions to send the notification to the computing device indicating the vantage point of the one or more vantage points from which the at least one of the one or more points of interest is viewable.

* * * * *